United States Patent [19]
Orimoto et al.

[11] Patent Number: 5,352,402
[45] Date of Patent: Oct. 4, 1994

[54] METHOD AND APPARATUS FOR MANUFACTURING BIAXIALLY ORIENTED, THERMALLY STABLE, BLOWN CONTAINERS

[75] Inventors: Hiroyuki Orimoto; Saburo Suzuki, both of Ueda; Fumiya Amari, Komoro, all of Japan

[73] Assignee: Nissei ASB Machine Co., Ltd., Komoro, Japan

[21] Appl. No.: 990,647

[22] Filed: Dec. 14, 1992

Related U.S. Application Data

[63] Continuation-in-part of Ser. No. 942,323, Sep. 9, 1992, abandoned, which is a continuation of Ser. No. 600,202, Oct. 18, 1990, abandoned.

[30] Foreign Application Priority Data

Oct. 23, 1989 [JP] Japan .................................. 1-275565
Feb. 9, 1990 [JP] Japan .................................. 2-30495

[51] Int. Cl.$^5$ .................... B29C 49/06; B29C 49/12; B29C 49/28; B29C 49/64
[52] U.S. Cl. .................... 264/526; 264/230; 264/235; 264/521; 264/530; 425/526
[58] Field of Search ............ 264/230, 235, 342 R, 264/346, 521, 526, 529, 530; 425/149, 526, 529, 530, 812

[56] References Cited

U.S. PATENT DOCUMENTS

| | | | |
|---|---|---|---|
| 4,153,667 | 5/1979 | Brady et al. | 264/532 |
| 4,177,239 | 12/1979 | Gittner et al. | 264/530 |
| 4,235,837 | 11/1980 | Noonan | 264/520 |
| 4,241,008 | 12/1980 | Flamand et al. | 264/529 |
| 4,318,882 | 3/1982 | Agrawal et al. | 264/521 |
| 4,372,735 | 2/1983 | Collette | 425/135 |
| 4,375,442 | 3/1983 | Ota et al. | 264/25 |
| 4,379,099 | 4/1983 | Ota et al. | 264/25 |
| 4,385,089 | 5/1983 | Bonnebat et al. | 264/529 |
| 4,397,808 | 8/1983 | Yoshino et al. | 264/521 |
| 4,482,518 | 11/1984 | Brady, Jr. | 264/535 |
| 4,512,948 | 4/1985 | Jabarin | 264/521 |
| 4,522,779 | 6/1985 | Jabarin | 264/530 |
| 4,550,007 | 10/1985 | Ohtsu et al. | 264/530 |

FOREIGN PATENT DOCUMENTS

| | | |
|---|---|---|
| 0057504 | 8/1982 | European Pat. Off. . |
| 155763 | 2/1984 | European Pat. Off. ............ 264/530 |
| 0237459 | 9/1987 | European Pat. Off. . |

(List continued on next page.)

OTHER PUBLICATIONS

Branscome, "How to Handle Haze, and Acetaldehyde too, in PET Blowmolding", *Plastics Engineering*, May 1980, pp. 66–69.

"Relaxation–stretch—new Route to PET Bottles", *Modern Plastics International*, Sep. 1986, p. 22.

*Primary Examiner*—Catherine Timm
*Attorney, Agent, or Firm*—Christie, Parker & Hale

[57] ABSTRACT

A method of producing a blow-molded PET container suitable for hot-filling includes the steps of injection molding a preform, blow-molding the preform into a primary molded article larger than the desired final container, heating the primary article in a series of oven chambers while its mouth is sealed so that pressure builds within the article to thereby control shrinkage, and blow-molding the shrunken article into the desired container. The two molds are preferably heated, and the mold contact time is as long as allowed by the manufacturing process to help remove internal stresses in the article. An apparatus for carrying out the method includes a first machine having an injection station, a thermal conditioning station, a primary blow-molding station, and an exit station. A second machine includes the oven chambers and a final blow-molding station. The primary article is sealed by a cap member that has a pressure relief valve connected to it to limit the internal pressure during heating, an air supply passage for final blow-molding, and a tensioning rod for insertion into the primary article and engaging a pocket in the center of the article's bottom. In some applications, it is necessary to stiffen the neck, particularly when hot-filling at about 200° F. or higher, or when using a closure roll-on die or a lugged neck finish to apply a bottle cap to the final container.

31 Claims, 9 Drawing Sheets

U.S. PATENT DOCUMENTS

| | | | |
|---|---|---|---|
| 4,584,158 | 4/1986 | Nilsson et al. | 264/529 |
| 4,589,559 | 5/1986 | Hayashi et al. | 215/1 |
| 4,590,021 | 5/1986 | Ota et al. | 264/25 |
| 4,603,066 | 7/1986 | Jabarin | 428/35 |
| 4,820,795 | 4/1989 | Hirata et al. | 528/272 |
| 4,836,971 | 6/1989 | Denis et al. | 264/521 |
| 4,839,127 | 6/1989 | Ajmera et al. | 264/526 |
| 4,846,656 | 7/1989 | Denis et al. | 425/174.4 |
| 4,933,135 | 6/1990 | Horwege et al. | 264/521 |
| 5,145,632 | 9/1992 | Denis et al. | 264/521 |
| 5,248,533 | 9/1993 | Sugiura et al. | 428/35.7 |

FOREIGN PATENT DOCUMENTS

| | | | |
|---|---|---|---|
| 442836 | 8/1991 | European Pat. Off. | 264/521 |
| 56-105935 | 8/1981 | Japan . | |
| 57-53326 | 3/1982 | Japan | 264/529 |
| 58-56828 | 4/1983 | Japan | 264/529 |
| 58-220711 | 12/1983 | Japan . | |
| 60-189418 | 9/1985 | Japan . | |
| 62-238730 | 10/1987 | Japan | 264/535 |
| 2108899 | 5/1983 | United Kingdom . | |
| 2145365 | 3/1985 | United Kingdom . | |

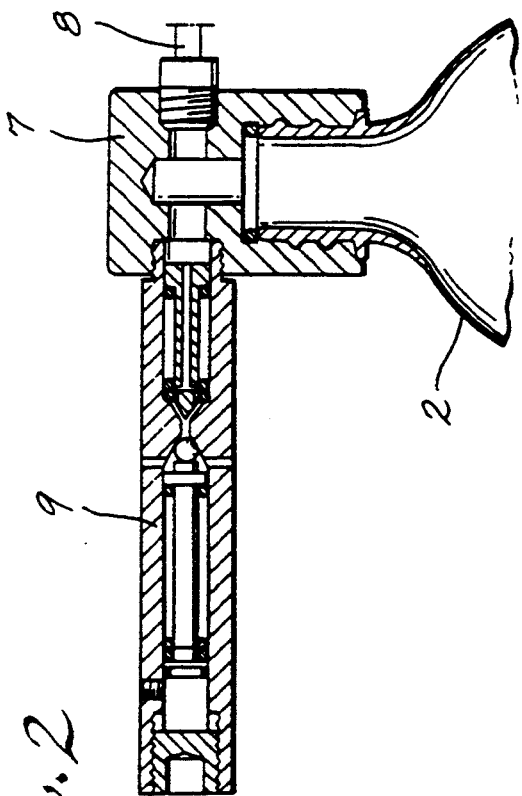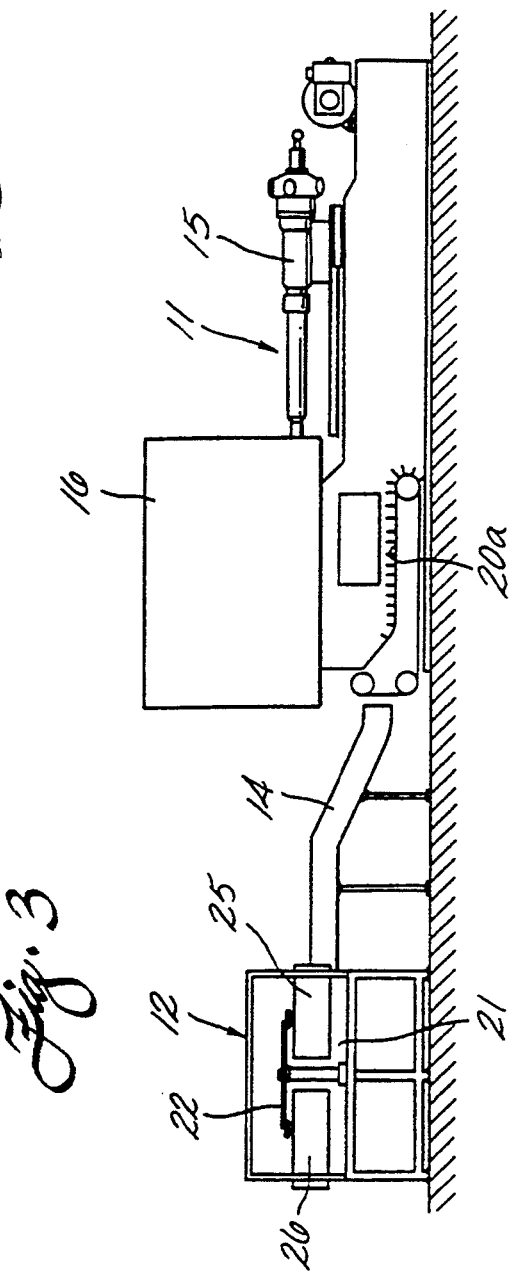

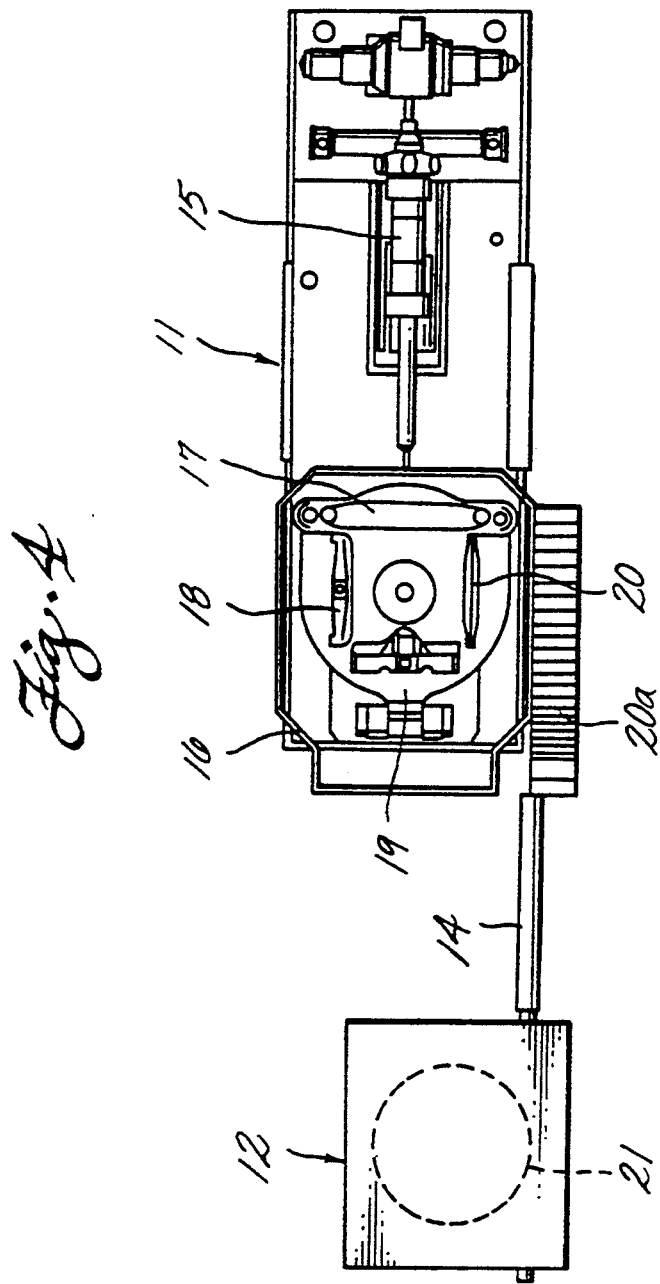

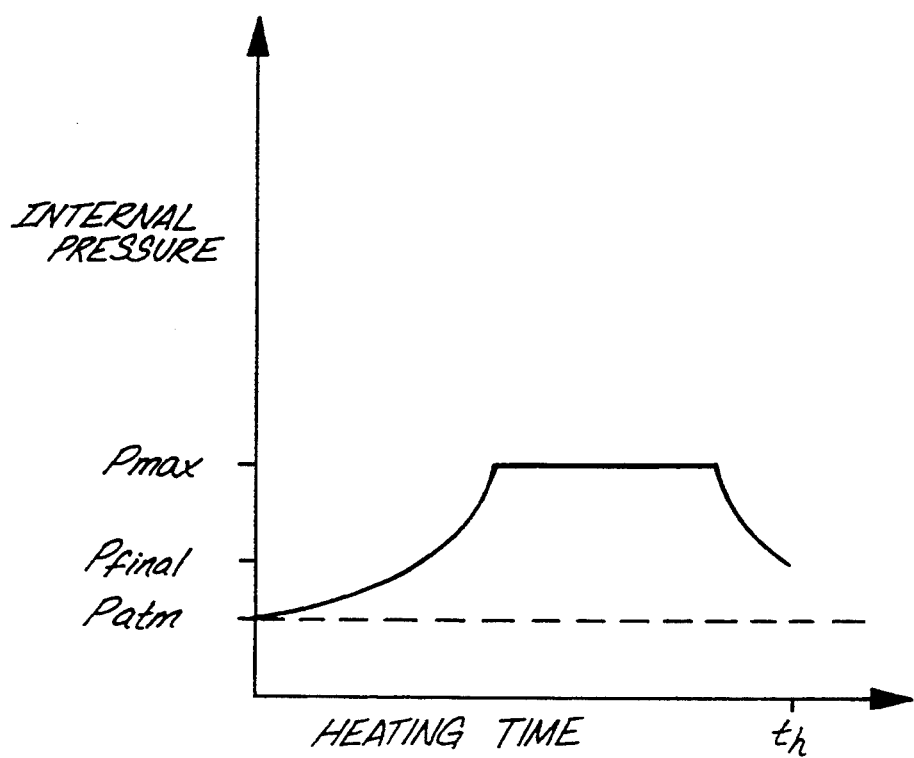

METHOD AND APPARATUS FOR MANUFACTURING BIAXIALLY ORIENTED, THERMALLY STABLE, BLOWN CONTAINERS

CROSS-REFERENCE TO RELATED APPLICATIONS

This application is a continuation-in-part of application Ser. No. 07/942,323, filed Sep. 9, 1992, entitled "Method for Manufacturing Heat Set Biaxially Oriented Blown Containers", now abandoned, which is a continuation of application Ser. No. 07/600,202, filed Oct. 18, 1990, entitled "Method for Manufacturing Heat Set Biaxially Oriented Blown Containers", now abandoned, incorporated by reference herein.

BACKGROUND OF THE INVENTION

1. Field of the Invention

This invention relates to a method for manufacturing heat-treated, biaxially oriented, thermally stable, blown containers suitable for hot-filling applications, and apparatus for manufacturing the same.

2. Description of the Relevant Art

In recent years, plastic, especially polyethylene terephthalate (PET), has been more and more widely used to make beverage (and food) containers, as it is inexpensive and durable. However, in the process of bottling many beverages, the plastic containers must be filled with the beverage at an elevated temperature sufficient to ensure sterilization. Exposure of the plastic container to the hot beverage can cause the plastic to soften and deform, especially over time, because the temperature of the beverage is often above the glass transition temperature of the plastic. Moreover, because such containers are typically made by blow-molding a preform, there is a large amount of stress frozen in the container walls. This stress, when it relaxes in response to heat, causes the container to shrink.

Beverages which are pasteurized, as is the case with many European drinks, are treated in a range of 148° to 170° F. Drinks which include a portion of fruit juice are typically "hot-filled" in a range of 170° to 185° F. In these ranges, two currently-used single-mold processes are that of U.S. Pat. No. 4,863,046 to Collette et al and assigned to Continental PET Technologies, Inc., and another process involving blow-molding in a heated mold and maintaining the article in contact with the heated mold walls, such as described in U.K. published patent specification No. 1,474,044 by Collins and assigned to Imperial Chemical Industries Limited.

The Collette et al process involves a series of heat treatments to a preform, followed by axially stretching the preform, then blow-molding it in a heated mole. The Collins process involves blowing the preform in a hot mold, usually around 100° C., and maintaining the resultant container in contact with the mold walls for a period of time, such as 6 to 8 seconds or longer. For example, Nissei ASB Machine Co., Ltd. practices a variation of this method in which a preform is blow-molded into a hot mold and maintained in contact with the mold walls for up to about 25 seconds or longer as allowed by the longest other process in the manufacturing cycle. The hot mold walls will enable some limited thermally-induced crystallization and some limited annealing, i.e., limited release of stresses created by blow-molding. The mold walls can be heated up to temperatures which are much higher than 100° C., but, at some point, the plastic container will begin to lose its rigidity and utility, depending on the material used, its thickness, the contact time, and other factors.

These single-mold processes achieve moderate thermal stability. However, at higher hot-fill temperatures, i.e., 190° F. and up, which are needed to sterilize fruit drinks and the like, these single-mold processes are not sufficient to enable the resultant container to withstand such hot-filling without substantial deformation. The combination of these elevated filling temperatures and the time for which the container walls are exposed to these temperatures during filling, which can be as much as two minutes or more, increases the mobility of polymer chains and allows stresses to relax that would not normally relax during either of the above single-mold processes. This is because the PET polymer has a range of molecular weights, and the molecules accordingly take a range of times to relax. That is, some of the PET polymer molecules will relax quickly, while other PET polymer molecules will take longer times to relax. Because of the limited temperatures at which the mold walls can practically be kept, and the limited time at which the container can be kept in contact with the mold walls due to manufacturing production constraints, these single-mold processes cannot achieve sufficient relaxation of stresses to enable the resultant container to withstand this higher range of hot-filling temperatures. Moreover, due to polymer "initialization" times, i.e., the threshold time at a given temperature that it takes a polymer before it will begin to relax, and due to the practical limitations of the manufacturing process upon the mold wall temperature and contact time, there is insufficient heat and time to obtain any substantial relaxation of the "longer-term" stresses. Therefore, to provide improved shrinkage resistance, two-mold blow-molding processes in which a first blow-molded article is heated to a relatively high temperature, or for a relatively long time, and allowed to shrink as a result of the heating, then is reblown, have been proposed.

One such two-step process is disclosed in U.S. Pat. No. 4,550,007 to Ohtsu et al and assigned to Mitsubishi Plastics Industries Limited. In this patent, the first molded article can be slightly larger than the desired final container. The first article is heated in the first mold by keeping it in contact with very hot mold walls, e.g., from 130° C. for 5 seconds to 230° C. for 2 seconds. Then the article is removed and allowed to freely shrink. It is promptly transferred to a second mold heated at 60° to 150° C., where it is blown into a final container.

In European patent application No. 0,155,763, assigned to Yoshino, a similar process to that of Ohtsu et al is disclosed. That is, the first article can be slightly oversized in relation to the final desired container, and it is heated in the first mold, then allowed to freely shrink and then reblown.

In both of these two-mold processes, the initial blown article is heated in the mold and then allowed to freely shrink. The free shrinkage of the first article creates unevenness in its wall thickness and thus unevenness in the final blown container. Moreover, the time that the article remains in the first mold for heating is limited by practical constraints upon the molding process. The longer the heating, the longer the molding process, and the less commercially attractive due to lower production rates.

Another two-blow-molding-step process is disclosed in U.S. Pat. No. 4,836,971, issued to Denis et al and assigned to Sidel. In this process, the first blown article is heated in a large oven, separate from the first mold. The process starts with a pre-made preform which first has its neck heated to crystallize it, and then the neck is cooled. The preform is then heated, using infrared heaters, to an appropriate temperature between 100° to 120° C. for 10 to 80 seconds while being rotated, and then subjected to blow-molding in a cold first mold, i.e., 5° to 40° C., which does not provide any appreciable stress relaxation. The first mold cavity is larger than the final desired container, such that the first blow-molded article is larger than the final container, This oversized article is then heated in the oven at 180° to 220° C. for 1 to 15 minutes and allowed to freely shrink. The crystalline neck is needed to withstand the heat of the oven so that the neck does not deform. The article shrinks to a size smaller than the final desired container and experiences uneven shrinkage such that it typically has a chili-pepper-like shape. The shrunken article is then placed in a final mold and blown to form the final container.

This method often results in a final container having a crystalline haze and an opaque white crystalline base, both of which are undesirable. This haze occurs due to the unrestrained free shrinkage of the article which allows the development of zones of crystallinity on a macro-scale. That is, such zones of crystallinity exceed the wavelength of light in a size, and this causes the milky crystalline haze. Moreover, because shrinkage is unrestrained, there are areas of weakness created in the shrunken article such that, upon reblowing, there can be pinholes or weakened areas in the final container causing it to be rejected. In addition, the center of the bottom of the article can wander, causing the final container to be lopsided. Further, the distribution of wall thickness is nonuniform.

It is also necessary in this Denis et al method for a separate machine to make preforms from the first blow-molding machine. In addition, because the preforms are pre-made, there must be equipment to heat them to an appropriate temperature for stretching in the first blow mold.

In addition to the heat of hot-filling causing shrinkage and a reduction in container sidewall stiffness, there is also an internal vacuum created in the container as the hot-filled liquid cools. Therefore, buckling of the container can occur, especially if the sidewalls have weakened areas.

Accordingly, there is a need for a process to make a plastic, e.g., PET, container that is stable, even under classic hot-filling conditions, e.g., above 185° F., and especially 190° to 203° F. and above, and sparkling glass-like containers.

SUMMARY OF THE INVENTION

The present invention achieves a hot-fillable container of PET. This container is fillable, even at temperatures of 175° F. or higher. In particular, the container is fillable at temperatures as high as 185° F. to 203° F. and above. Moreover, the method achieves a container which has relatively uniform wall thickness, sparkling glass-like clarity, and a low percentage of shrinkage from hot-filling and otherwise.

In the method according to this invention, a preform is formed into a primary molded article of a size larger than a final container by orientation blow-molding, the primary article is heat-treated causing it to contract to smaller than a final blow mold cavity, then the contracted article is blown into the final container. Internal pressure is built up or increased to a predetermined maximum amount in the primary molded article during the heat treatment so that contraction is controlled by the builtup internal pressure. Preferably, further increase in the internal pressure is limited by discharge of air within the primary molded article by a pressure relief valve so that the pressure stays at the predetermined amount.

More specifically, in a preferred embodiments, a preform is injection-molded, and then temperature-conditioned, i.e., temperature-adjusted, to an appropriate blow-molding temperature by being slightly blown against the walls of a temperature-conditioning unit. Then, the primary molded article is formed with a predetermined size and with the shape of a container by blow-molding a single layer or multilayer preform. The primary article also preferably has a waist and a bottom with a central recess or pocket on the inside. The walls of the blow mold are preferably heated, and the mold contact time is preferably as long as allowed by the manufacturing process to help remove residual stress from the article, in contrast to the process of U.S. Pat. No. 4,836,971 to Denis et al disclosed in the Background of the Invention section. After blow-molding, the primary molded article is delivered to a heating unit and held by its neck portion. The primary article is fitted with a cap device to seal its mouth, and an extendible spring-loaded support rod is inserted into the primary article until the rod engages the center of an inner bottom surface of the article at the pocket. The article is placed under moderate tension in a longitudinal direction due to the support rod. The heating unit is preferably formed by several consecutive, individually heated oven chambers.

The entire primary article, except the neck, is heated in the heating unit under this tension condition, and the primary molded article shrinks. As the article shrinks, internal pressure builds. The shrunken article, with the seal and support rod in place, is relatively uniform in wall thickness and symmetrical in shape due to the control of contraction by the builtup internal pressure and the support rod. The shrunken article is positioned in a final mold for molding a container immediately after heat treatment and is then blown into a final container. Preferably, the final mold is heated, and the container is maintained in contact with the mold walls for a period of time to help further reduce any internal stresses. Thus, in the preferred embodiment, there are three stages of stress relaxation, i.e., in the first blow-mold, in the heating unit, and in the final blow-mold. This helps maximize stress relaxation in a given total cycle time.

Although the invention is not limited to any particular set of parameters, preferred parameters for the conditioning time, first mold wall temperature and mold wall contact time, second mold wall temperature and mold wall contact time, furnace air temperature, and heating time in the furnace, are set forth in the detailed description below. Parameters for the volume, height, and diameter of the primary article in relation to the final article are also disclosed in the detailed description.

An apparatus for carrying out the method includes an injection orientation blow-molding machine for continuously carrying out operations from injection-molding of a single layer or multilayer preform to orientation blow-molding of the primary molded article. The first machine includes a preform injection molding station, a thermal conditioning or treatment station where temperature gradients in the preform walls are removed or reduced, and a primary blow-molding station in which blow-molding and stress relaxation or annealing occurs by contact with the walls of a hot mold. The machine then discharges the primary article, and it is carried by a transport device to a second machine which has a heating unit and a final blow mold. At the second machine, a circulating transport mechanism grasps the primary molded article by its neck and carries it through the heating unit and into the final blow mold. Upon entering the heating unit, the primary molded article has the cap device fitted onto its mouth. The cap device includes an extendible blow pipe and support rod which are inserted into the article, with the rod engaging an inner bottom surface of the article. The device seals the mouth portion of the article.

The first machine, which includes a preform injection-molding station, a thermal conditioning station, a primary blow-molding station, and an ejection station, is preferably formed on one machine base. The second machine, which includes a loading or inlet station, a heating unit, a second blow-molding station, and an outlet or unloading station, is preferably formed on another single machine base.

Aside from the preferred embodiment, if the neck of the final container must be stiffened for room temperature or higher temperature uses, the apparatus can be adapted to perform such neck-stiffening, such as by using a multilayer preform or otherwise, as explained later.

The support rod used for the aforementioned heat treatment and blow-molding is composed of a tubular body for closing the mouth portion of the primary molded article, a sheath tube extended at the lower end of the tubular body, and a hollow rod fitted into the sheath tube and extendible with respect thereto. The hollow rod is spring-biased in a longitudinal direction.

In the invention, an entire primary molded article, except its neck portion, is thermally contracted under built-up internal resistance to the shrinkage, while heat-treating the article to thereby mold a heat-resistant final container with a relatively uniform wall thickness, with glass-like clarity, and without deviation of the center of the bottom. The invention provides a method and an apparatus for manufacturing such a container.

BRIEF DESCRIPTION OF THE DRAWINGS

FIG. 2 is a sectional view of a cap device used in the process of FIG. 1;

FIGS. 3-7 schematically show embodiments of an apparatus for manufacturing a biaxially-oriented blown container according to this invention, FIG. 3 being a side view of a first embodiment, FIG. 4 being a plan view thereof, FIG. 5 being a plan view thereof with an upper part of a heat-treating apparatus removed, FIG. 6 being a side view thereof, and FIG. 7 being a plan view of a second embodiment of the apparatus according to the invention;

FIG. 11 is a graphical representation of internal pressure in a primary molded article versus time as the article shrinks while in the heat-treating apparatus.

DETAILED DESCRIPTION OF THE PREFERRED EMBODIMENTS

Figure 1:
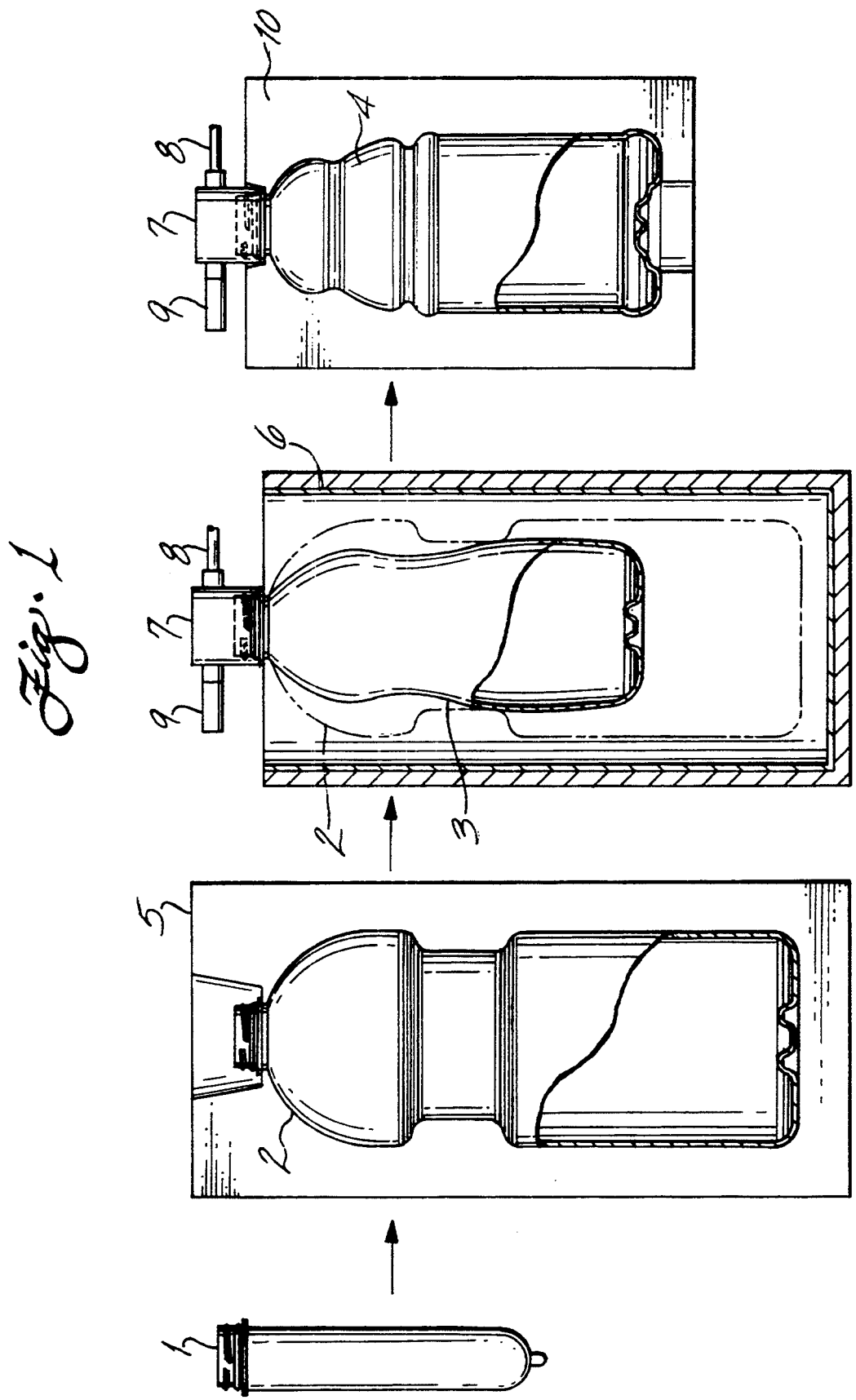
FIG. 1 is a schematic view showing steps of manufacturing a biaxially-oriented blown container according to this invention.

FIG. 1 shows, in sequence, molding steps in the manufacturing process according to the invention. Reference numeral 1 designates a preform formed by injection-molding, numeral 2 is a primary molded article, numeral 3 is a heat-treated molded article or shrunken article, and numeral 4 is a final molded article which is, e.g., a container.

Basically, the method is as follows. A preform 1, preferably of PET, is formed; an oversized primary molded article 2 is formed by blow-molding in a preferably hot mold 5, creating some strain-induced crystallization, which primary article preferably undergoes partial strain relaxation by continued contact with the hot mold; a shrunken article 3 is produced by heating the oversized primary article 2, preferably in a heating unit 6, such as an oven or series of oven chambers, to relax much of its internal stresses and to achieve some thermally-induced crystallization; the primary molded article is sealed, e.g., with a cap device 7, during heating in the heating unit so that when the article shrinks, internal pressure builds, thus controlling shrinkage, preserving strain-induced crystalline structure, avoiding crystalline haze, and maintaining a relatively uniform wall thickness of the primary article; then a final container 4 is created by blow-molding the shrunken primary article in a final mold 10, preferably while keeping the cap device 7 on the container.

More specifically, the preform is formed by injection molding. The length, wall thickness, and the like of preform 1 are designed with primary molded article 2 in mind. That is, article 2 is blow-molded, e.g., to between 1.2 and 3 times larger in capacity than final container 4, and more preferably 1.4 to 1.73 times larger (e.g., about 1½ times larger), so article 2 can be made longer than the case of typical one-step molding processes and can be made thinner in wall thickness than such typical processes. With regard to the size of the primary article, there is a tradeoff between its size and the productivity of the method and apparatus for making bottles.

Before the first blow-molding step, injection-molded preform 1 is adjusted in temperature so that it is suited for orientation blow-molding. Then, the preform is positioned in a cavity of a primary blow mold 5 and blown into a primary molded article 2, and the article is larger than the final container. Preferably, the article is molded with a waist around its sidewalls and a pocket in its bottom, which pocket is centered.

It is also preferable that the primary blow mold be heated, and that once the article contacts the mold walls, the article be kept in contact with the walls for a period of time to achieve appreciable stress relaxation, which relaxation is cumulative with the stress relaxation that takes place during the subsequent heating step. The longer the time, the greater the stress relaxation. In most instances, time in the first mold is, as a practical matter, governed by the longest step in the manufacturing process, which typically is the injection-molding process to form the preform 1. Therefore, in such instances, the time in the mold should be as long as allowed by the longest step in the manufacturing process to achieve as great a mold contact time as possible. For example, in the first mold, the mold wall temperature may be on the order of about 60° to 70° C. or more, and the mold wall contact time may be on the order of 1 to as much as 15 to 18 seconds or more, and preferably is about 5 to 15 seconds, e.g., 10 seconds. Other temperatures and times may also be suitable.

All of the steps to this point are preferably carried out by structure on a first machine base, including an injection-molding device for creating a preform, a conditioning unit for temperature adjustment of the preform, a primary blow-molding station for blow-molding the primary article, and an exit station.

After primary molding, the molded article 2 is sent to heating unit 6. At this time, cap device 7, shown in FIG. 2, is airtightly fitted onto the neck to seal the mouth portion of article 2.

A high-pressure blow air flow passage 8 and a relief valve 9 for adjusting internal pressure are connected to cap device 7. After this, the primary article 2 is heated in unit 6. The whole article 2, thus heated, starts to contract, except for the neck portion, which is preferably cooled, or otherwise shrouded from the heat.

The heating unit 6 is preferably really a series of oven sections comprising a chamber with shutter doors, each chamber being individually temperature controlled. In such an oven, the primary article passes from chamber to chamber so that it receives a series of heat treatments. These chambers can have a desired temperature profile such as ascending, descending, uniform, ascending then descending, and so on. The heating is preferably by communicating each chamber with its own hot air source to flood the chamber.

This contraction due to the heating continues until the article becomes smaller than a cavity of a final blow mold 10. Since walls of the shrunken article 3 are tensed by the builtup internal pressure, uneven contraction of the article is avoided, and heat shrinkage occurs in the article against balanced builtup internal pressure. As a consequence, uneven shrinkage is greatly reduced in comparison with the case where an article is allowed to freely shrink. This tension during shrinkage ensures the preservation of the underlying strain-induced crystallinity from blow-molding to maintain strength and limits the size of zones of thermally-induced crystallinity, thus preserving sparkling opticals and providing freedom from crystalline haze. That is, a relatively high level of crystallinity is achieved without haze.

During heating, the internal pressure of the article will increase due to the reduction in the size of the molded article, according to the well-known law $P_1V_1/T_1 = P_2V_2/T_2$. The internal temperature, to the extent that it changes, will increase, thus further increasing the pressure. However, because the article is plastic, it will insulate against the external heat to some extent.

To prevent the pressure from becoming too high, i.e., from increasing to a point where it could be difficult to reduce the article to a size smaller than the final mold cavity, the building pressure is limited to a set or predetermined pressure, e.g., from about 1.1 to 1.3 atmospheres (0.1 to 0.3 gauge pressure), and preferably 1.2 to 1.3 atmospheres (0.2 to 0.3 gauge pressure). Therefore, any increase above the set pressure is preferably relieved by relief valve 9. The appropriate maximum internal pressure depends on the amount of contraction required to reduce to a size suitable for final blow-molding by the time heating is completed. It is also preferable to heat the heating unit to between 130° C. and 280° C. for a time period of between 20 and 120 seconds and, more preferably for at least 30 seconds and at least 220° C. to 230° C. That is, each chamber is flooded with air at an individual temperature which is preferably in this range. Generally speaking, the higher the temperature, the lower the duration needed to achieve the same amount of relaxation. It is noted that it is preferable to cool or insulate the neck area of the preform during the heating step to avoid possible deformation of the neck area.

The thus-heated and shrunken article 3 is immediately transported to the final blow mold 10, which is preferably heated in a range from 60° to 75° C. and blow-molded into final container 4, e.g., with a contact time of 1.5 to 2.0 seconds. The heated second mold and the mold wall contact time provide additional annealing, and thus further strain relaxation occurs. Shorter or longer contact times, e.g., from 1 up to 10 seconds or more, may be desirable, especially the longer times for additional annealing.

Cap device 7 remains in place during heating and final blow-molding. Thus, flow passage 8 is used to supply pressurized blow-molding air, without the need to remove cap device 7. Therefore, shrunken article 3 still contains builtup internal pressure (above one atmosphere, i.e., above the external pressure) and will not shrink freely. However, it is preferable to vent some of the builtup pressure within shrunken article 3 just before insertion of the article into final blow mold 10 to ensure that the shrunken article 3 will fit into the final mold cavity. The remaining pressure after venting is preferably still above one atmosphere to continue resisting shrinkage. Preferably, the final molding cycle time is as long as possible as a practical matter.

A graphical representation of a preferred internal pressure profile in article 2 during its time ($t_h$) in the heating unit 6 is shown in FIG. 11. Upon introduction into the unit 6, pressure begins building from one atmosphere ($P_{atm}$). After awhile, it reaches the predetermined amount ($P_{max}$) set by valve 9, then remains there until vented to a desired pressure ($P_{final}$) for transfer to the final blow mold.

Where there are several oven chambers, e.g., five, one example of how the pressure could vary is that in the first two chambers, the pressure increases. The pressure might reach the maximum in the third oven chamber and remain there through the fourth oven chamber. At or near the end of heating in the last chamber, the pressure could be released somewhat to the desired final pressure.

Several examples of heat-treatment conditions for a primary molded article 2 and the density and hot-filling performance in terms of percent shrinkage of the final container 4 are given in Tables 1 and 2 below. Primary article 2 was formed from a PET injection-molded preform of 59 g. Percent shrinkage was measured after hot-filling the final container with water at 90° C. (194° F.).

TABLE 1

| Heat treatment conditions of primary molded article (2.1 l capacity) | | |
| --- | --- | --- |
| Sample | Unit Temperature (°C.) | Treatment Time (sec) |
| 1 | 160 | 60 |
| 2 | 160 | 120 |
| 3 | 185 | 30 |
| 4 | 185 | 60 |

TABLE 1-continued

Heat treatment conditions of primary molded article (2.1 l capacity)

| Sample | Unit Temperature (°C.) | Treatment Time (sec) |
| --- | --- | --- |
| 5 | 190 | 60 |

TABLE 2

Results (50 g container weight and 1.5 l capacity)

| Sample | Average Density of Walls | Percent Shrinkage (%) |
| --- | --- | --- |
| 1 | 1.3741 | 0.8 |
| 2 | 1.3747 | 0.7 |
| 3 | 1.3721 | 1.6 |
| 4 | 1.3768 | 0.3 |
| 5 | 1.3785 | 0.2 |
| Conventional Container | 1.3698 | 2.5 |

The conventional PET container referred to in TABLE 2 was prepared by the Nissei ASB Machine Co., Ltd. of blowing into a hot mold, as described in the Background of the Invention section. The mold temperature was 105° C., and the molding time was 25 seconds. As is apparent from Table 2, the average wall density of the resultant container using the inventive method is greater than that of the conventional container, and the percent shrinkage is greatly reduced under hot-filling conditions compared with that of the conventional container. As can also be observed, the greater the density, the less the percent shrinkage. Moreover, higher density means a higher level of crystalline spherulites in the container walls.

The above method according to the invention carries out heat treatment of the primary molded article under internal pressure, which is greater than the external (atmospheric) pressure. In the disclosed embodiment, this internal pressure is achieved by sealing, or substantially sealing, the molded article, heating it, and allowing it to contract. The shrinkage of the article will cause the internal pressure to increase. Since the heat is applied outside the article, and the article is plastic, the internal air will probably not be appreciably heated.

This increased internal pressure ensures that contraction and reduction of the primary article is evenly carried out. In addition, since the distribution of wall thickness throughout the article is substantially set during heat treatment, the final molded article will be substantially uniform in wall thickness. Moreover, the percent shrinkage of the resultant container when hot-filled will be relatively small and regular, thus achieving a container with excellent durability. The resultant container also has excellent optical characteristics in relation to many conventional containers, including containers produced using the method of U.S. Pat. No. 4,836,971 to Denis et al discussed in the Background of the Invention section. An important reason for this is that, in the present invention, the primary container shrinks under internal pressure. The result is a heat-set, hot-fillable, glass-like container that is aesthetically desirable to manufacturers and consumers.

Furthermore, the manufacturing cycle using the invention can be shorter than that of the conventional PET container referred to in TABLE 2 and other conventional cycles, yet achieve a container with lower frozen-in stress. For example, the conventional PET container referred to in TABLE 2 was created using a molding cycle that took a total of 34 seconds, whereas the container according to the invention was created in 27 seconds, including injection-molding of the preform through creation of the final container. Part of the reason for this is that the oversized primary article is longer and has thinner walls than a conventional single-mold article, so comparable stress reduction is achieved with shorter mold wall contact time. Moreover, substantial stress reduction is achieved in the heating unit.

Below are additional examples of parameters for the method according to the invention.

TABLE 3

(2.0 l bottle)

| | |
| --- | --- |
| Ratio of Primary Article Volume to Final Article Volume | 1.4 |
| Preform Conditioning Range | 75 to 97° C. |
| Preform Conditioning Time | 15 to 18 sec |
| Ratio of Primary Article Height to Final Article Height | 1.28 |
| Ratio of Primary Article Diameter to Final Article Diameter | 1.00 |
| Temperature of First Mold Walls | 60 to 70° C. |
| First Mold Wall Contact Time | 5 to 15 sec (e.g., 10 sec) |
| Furnace Air Temperature | 220 to 230° C. |
| Time in Furnace | About 30 sec (e.g., 32.5 sec) |
| Internal Pressure | 1.1 to 1.3 atm |
| Temperature of Final Mold Walls | 60 to 75° C. |
| Final Mold Wall Contact Time | 1.5 to 2.0 sec |

The above TABLE 3 shows various exemplary parameters for a 2.0 l final bottle. For a 1.5 l final bottle, a suitable volume ratio of the primary to final article might be 1.73, and the diameter ratio might be 1.07.

The above process will now be explained in more detail with further reference particularly to FIGS. 3–4, which show an apparatus for producing a container according to the inventive process. The apparatus has an injection orientation blow-molding machine 11, a transfer device 14, and a heating and blow-molding machine 12. Machine 11 is generally of conventional construction having an injection section consisting mainly of an injection device 15 and having an orientation blow-molding section 16. PET or other raw polyester resin or plastic material (typically in dried pellet form) is fed to injection device 15 which injects the dried pellets into an injection-molding unit 17 of section 16, where preform 1 is formed having a neck 1a with an open mouth at the top. The neck preferably corresponds to a shape and size of a neck of the final container.

The preform 1 is then transferred to a temperature control unit 18 or thermal conditioning unit of section 16, e.g., by an intermittently rotating transfer plate. The temperature control unit treats the preform by using temperature exchange so that the preform's temperature is substantially uniform or distributed as desired, and the unit may apply slight internal pressure. In particular, the preform is preferably blown slightly to be in contact with walls of a conditioning pot in the temperature control unit. This pot has heated oil or other heat exchange fluid passed through its walls to remove heat from, and equalize heat across, the preform body, in effect, carrying out cooling of the preform which is hot from injection-molding. In addition, it is often preferable to have different oil paths in contact with, e.g., four metal rings around the pot, each at temperatures selected to provide a desired temperature variation along the vertical height of the preform, e.g., at 75° to 97° C.

In one example, the top or first ring is at 88° to 97° C., the next ring is at 75° to 80° C., the third ring is at 75° to 80° C., and the final or bottom ring is at 83° to 88° C. Other temperatures may also be suitable. Further, the shoulder area of the preform may be heated to facilitate blow-molding.

Next, the transfer plate carries the preform to a primary or first blow-molding station 19 of section 16, where the preform enters a primary mold (such as mold 5 of FIG. 1) which is preferably heated. The resultant primary molded article 2 is transferred to a release or exit station 20 of section 16, where it is delivered to a conveyor 20a located at the side of section 16 of machine 11. Preferably, machine 11 is constructed on a single machine bed which includes injection device 15 and orientation blow-molding section 16.

Conveyor 20a carries the primary molded article to transfer device 14 which, in turn, carries the article to the heating and blowing machine 12. Machine 12 includes a heating unit or station 21 (which corresponds to heating unit 6 of FIG. 1). This station 21 may be an annular tunnel oven, but is preferably a series of oven chambers, e.g., defined by shutter doors 21a, as described above. With additional reference to FIGS. 5 and 6, the heating and blowing machine has a rotary disk 22 which circulates within heating unit 21 and which grabs each primary molded article 2 from transport device 14 by the neck and indexes them from oven chamber to oven chamber. An elevating section 23 of the heating unit serves to raise and lower a blow tube and support rod (as explained later with reference to FIGS. 8–10) provided on rotary disk 22. Machine 12 also has a blow mold 24 (which corresponds to final blow mold 10 of FIG. 1).

Figure 5:
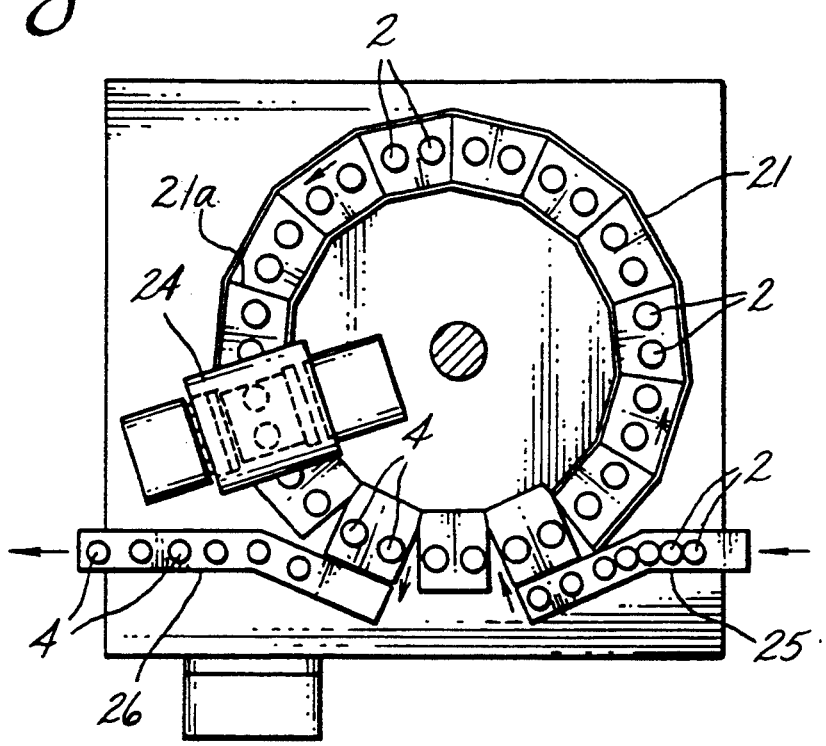
Figure 6:
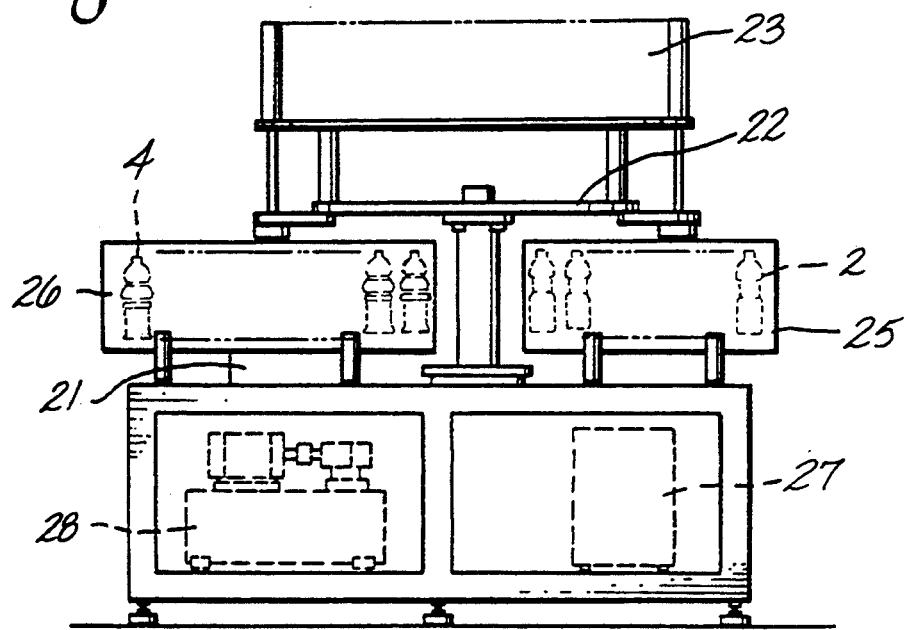

Primary articles 2 enter machine 12 at an inlet or supply station 25 in communication with transport device 14 where they are gripped at their necks by rotary disk 22 and carried through heating unit 21 (in a counterclockwise direction, as shown in FIG. 5). The primary articles are carried through the unit 21, and the resultant shrunken articles 3 enter the final blow mold 24. The resultant final containers 4 are carried to a removal or exit station 26 of machine 12. Machine 12 also has a hot air generator device 27 for supplying hot air to the heating unit 21 and a hydraulic unit 28 for controlling the moving parts of machine 12. Preferably, since station 21 is formed by a series of oven chambers, generator device 27 is formed by a corresponding series of generators, i.e., one for each oven chamber. Supply station 25 and removal station 26 are provided at an inlet of heating unit 21 and an outlet of the final blow-molding station, respectively. Preferably, machine 12 has a single bed on which all of its elements are mounted.

Figure 8:
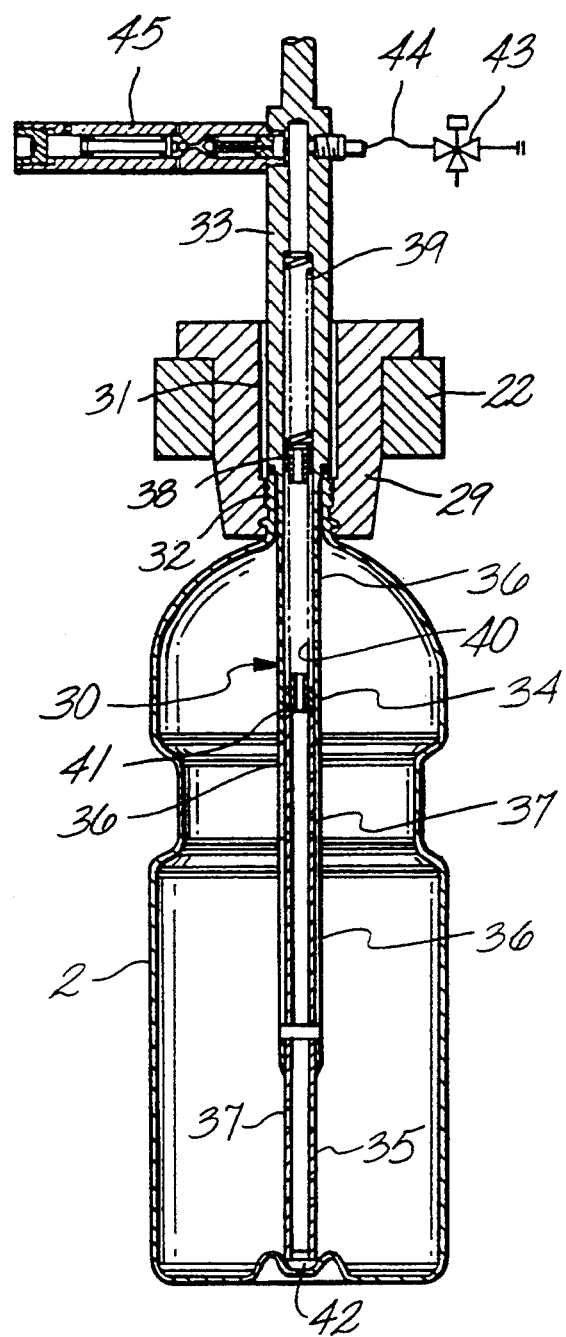
FIGS. 8–10 are respective longitudinal sectional views for explaining, in sequence, the working steps within the heat-treating apparatus in accordance with all illustrated embodiments of the invention.
Figure 9:
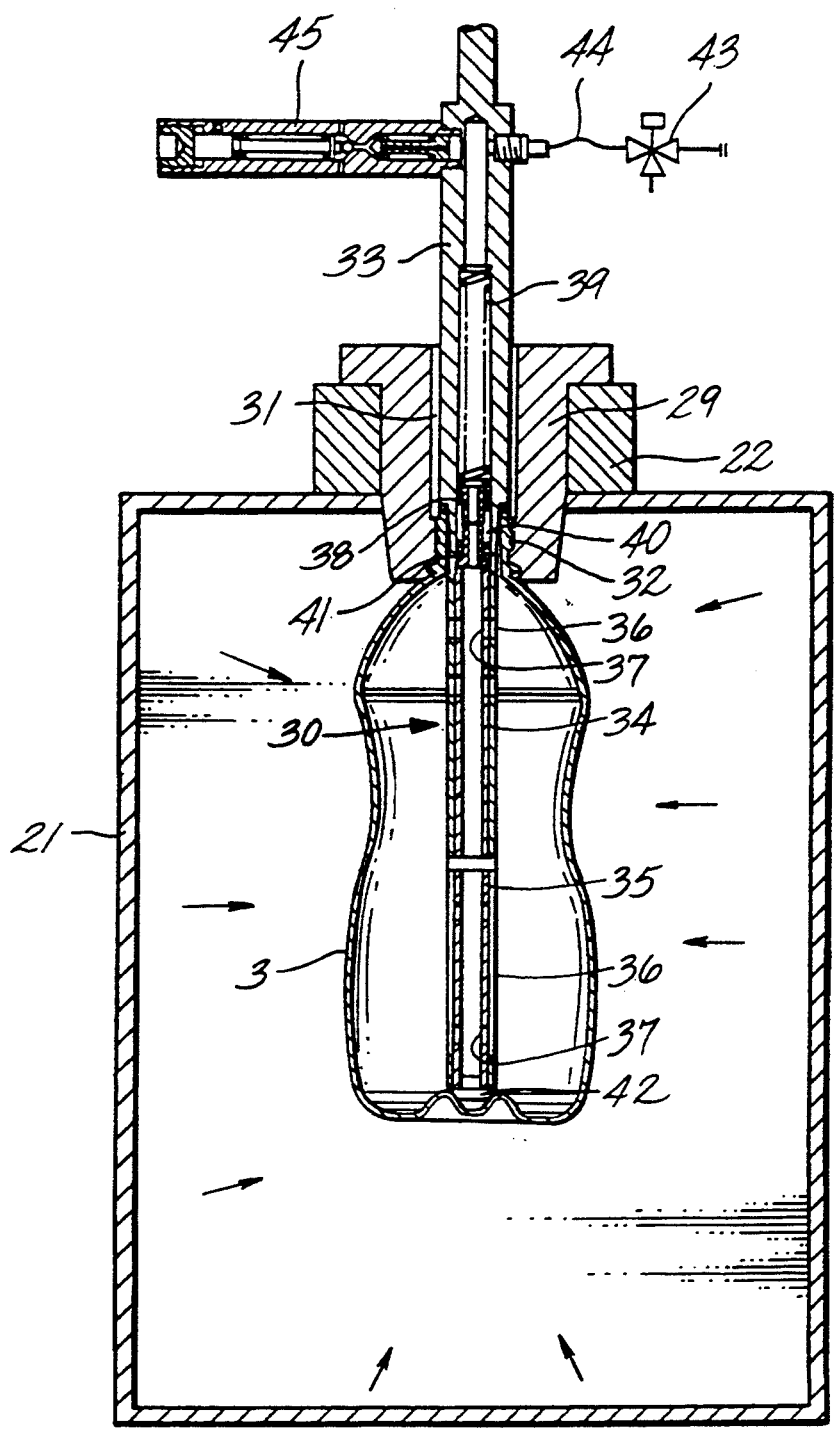
Figure 10:
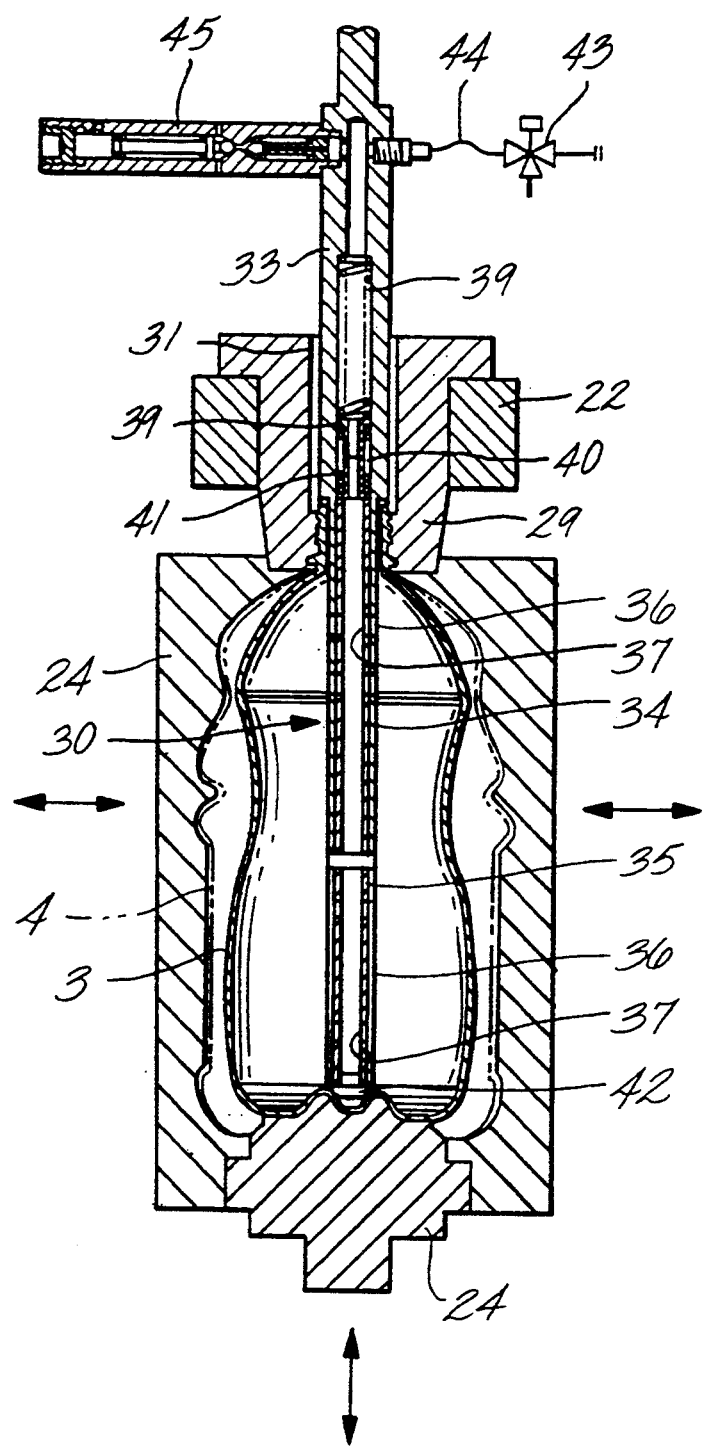

FIGS. 8–10 show, in sequence, apparatus fitted onto and into the primary molded article 2 when it enters machine 12, and which apparatus remains there when the article has shrunk to form shrunken article 3, and when it is in the final blow mold where container 4 is formed, respectively. This apparatus (which was schematically represented by cap device 7 of FIG. 1) includes a combination blow tube and support rod 30 which serves as a conduit for compressed air for blow-molding and as a support to keep the bottom of the article centered and biased downwardly throughout heating and final blow-molding. FIGS. 8–10 also show how the rotary disk 22 grips the primary article 2, i.e., using a holding member 29. Though not shown in full detail, holding member 29 is formed by a pair of laterally closable holding pieces provided with a cooling flow passage. The holding pieces of member 29 cooperate to form an insert hole 31 for the support rod 30 and a neck holding recess 32 with appropriately shaped grooves for gripping the neck of article 2.

Support rod 30 includes a tubular body 33, a sheath tube 34, and a hollow rod 35. The lower end of tubular body 33 is fitted into the insert hole 31 so as to close and seal the mouth portion of article 2. Sheath tube 34 is part of or integrally connected to body 33 and extends from the lower end of the tubular body into the article 2. Hollow rod 35 is slidably supported within the lower portion of tube 34. Circular and longitudinally extending air holes 36 are provided in sides of tube 34, and a plurality of air holes 37 are also provided in the side of the hollow rod 35.

A spring mechanism downwardly urges rod 35 with respect to sheath 34. The spring mechanism is composed of two coil springs 39 and 40 vertically positioned inside the tubular body and around spring centering or seating members 38, 41, respectively. The upper coil spring 39 has a stronger force than that of the lower coil spring 40. A press member 42 or tab mounted at the extreme lower end of rod 35 is pressed against the inner bottom surface of article 2 by the springs.

At the upper end of tubular body 33, there is an air supply pipe 44 provided with a three-way valve 43 and a pressure control valve 45 (release valve). The valve 45 will obviously be closed at the time of blow-molding, but open during heating. In certain applications, it may be desirable to also provide some pressurized air through supply pipe 44 into the primary article during heating to further control and supplement the article's internal pressure. In such cases, it is easier to obtain internal pressures of up to 3.0 (2.0 gauge pressure) atmospheres or more.

To provide a better seal, an O-ring 48 may be inserted between the top of article 2 and the bottom of tubular body 33.

Next, manufacturing of a biaxially-blown container using the aforementioned apparatus will be described.

The primary molded article 2 is formed by the injection orientation blow-molding machine 11. Article 2 is in the general form of a bottle molded with a recess or pocket at a central portion of the bottom into which the tab 42 of the support rod 30 will be fitted.

In the case where the primary molded article is formed of crystalline resin, such as PET, the article is preferably formed to be larger in capacity by about 40 to 73%, or 50 to 60%, and longer in height by about 1.2 to 1.3 times in comparison to the capacity and length of the final container. Preferably, the first mold is heated, and the primary article is kept in contact with the mold walls to relax stress. The thus-formed primary molded article 2 is then delivered to the heat-treating and blowing machine 12 by conveyor 20a and transport device 14.

In the machine 12, the neck of article 2 is gripped by the cooled holding member 29 of the rotary disk 22, as shown in FIG. 8. At this time, the three-way valve 43 is closed. Support rod 30 is inserted into article 2 from above holding member 29 such that tubular body 33 is received in insert hole 31 and seals the mouth portion of article 2. Sheath tube 34 and rod 35 are positioned so that tab 42 fits into the molded-in recess centered in bottom of article 2. The springs 39, 40 now urge the tab 42 against the bottom of the article.

The primary molded article 2 is then fed into the heating unit 21 with the structure shown in FIG. 8 in place. The hot air in the unit ranges from 130° C. to 280° C., and preferably is from 180° C. to 260° C. and, more preferably, from 220° C. to 230° C. for at least 30 seconds of heating time.

As shown in FIG. 9, the primary molded article 2 becomes shrunken article 3 as its body is heated during passage through the heating unit. However, such shrinkage is relatively uniform and symmetrical due to the fact that internal pressure builds up from an initial amount corresponding to one atmosphere pressure and remains within the sealed molded article. This builtup internal pressure, together with the moderate tension exerted by the biased rod 35, controls shrinkage of article 2. The rod also serves to keep the article's bottom centered.

At this time, as the article shrinks, the shrinkage force moves rod 35 upward within the sheath tube 34 until the holders 38 and 41 come into contact with each other as the lower (weaker) coil spring 39 compresses. Furthermore, the internal pressure of the primary molded article 2 keeps increasing due to the reduction in capacity resulting from the contraction. However, the internal pressure is controlled so as to have a moderate contraction resistance by the pressure regulating valve 45, so that the pressure does not increase beyond a predetermined amount. Otherwise, it will be difficult for the article 2 to continue shrinking. Deviation of rod 35 from the bottom during the contraction process is prevented by the engagement of the tab in the recess.

Once the holders 38 and 41 come into contact with each other, the shrunken article 3 is to be at a height approximately the same as, or slightly greater than, that of the final container 4, and the diameter of the body portion is formed to be smaller than the diameter of the cavity of the final blow mold 24. The shrunken article 3 has a relatively uniform thickness due to the heating and contraction under pressure, and therefore, residual stress or strain created by injection-molding and primary blow-molding are removed with relatively limited shrinkage in relation to the method of Denis et al or other method, especially in the diameter of the primary article. Therefore, the final container has relatively high uniformity of wall thickness and strength. In addition, the final container has excellent optical clarity and is sparkling due to the restrained shrinkage of the primary article which hinders or avoids the formation of zones of crystallinity on a macro-scale. That is, zones of crystallinity are hindered from exceeding the wavelength of light in size, and thus crystalline haze is avoided.

The shrunken article 3 is immediately fed in a softened state, together with its cap and the support rod 30, into the opened final mold 24 adjacent the outlet of heating unit 21, as shown in FIG. 10.

When the shrunken article 3 is located at a predetermined position in the mold, while being supported on the support rod 30, the bottom mold 24a moves upward. The bottom mold 24a pushes up the bottom supported by the hollow rod 35 and thus compresses the upper (stronger) coil spring 39, thus moving rod 35 upwardly. Therefore, closing of bottom mold 24a is not impaired, and the bottom is held by the bottom mold 24a in a firm state which prevents eccentricity of the bottom.

Mold 24 is clamped, after which air of 25 to 30 kg/cm² is blown into the shrunken article 3 through the support rod 30. This air-blowing is promptly carried out by operating the three-way valve 43 to connect the support rod to a compressed air source, and the article is expanded fully within the cavity and molded into a final container 4. Preferably, the mold walls are heated, and the article is kept in contact with the heated walls.

After blow-molding, the high-pressure air within the container is discharged. The discharge of air is completed by switching the three-way valve 43 to a release position to communicate the support rod with the atmosphere. Then the mold is opened.

The container 4, molded by the aforementioned steps, is heat-set prior to final blow-molding and is, therefore, excellent in heat resistance as compared with a container obtained by one-step orientation blow-molding processes. Thus, the container 4 can be used as a container for hot-filling at high temperature as is.

While in the above-described embodiment, fitting between the tab 42 at the extreme end of the hollow rod and the center of the bottom of the primary molded article 2 is carried out by the recess formed on the bottom side, it is to be noted that the tab and bottom side may be formed concave and convex, respectively, as the case may be.

While in the drawings, feeding of primary molded articles 2 to heating unit 21 is carried out in pairs, it is noted that the articles can be fed singly or in groups of three or more to increase or decrease the processing ability, as desired.

Figure 7:
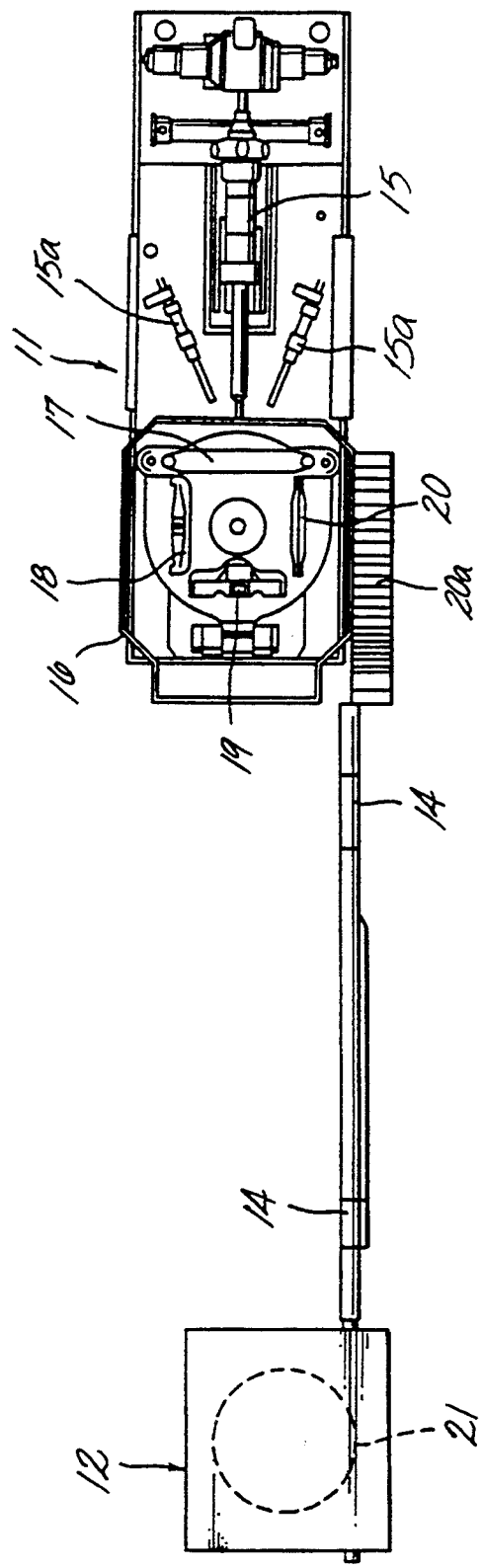

In some applications, it is necessary to stiffen the neck, particularly when hot-filling at about 200° F. or higher, or when using a closure roll-on die or a lugged neck finish to apply a bottle cap to the final container. With reference to FIG. 7, one way to do this is to achieve a partly or wholly multilayered container 4. In such case, an injection device 15a is provided in addition to injection device 15. For example, the devices can be controlled such that one injects a central layer into injection molding section 17. In particular, the injection devices 15, 15a can be controlled, as is known in the art, to achieve a multilayered neck portion only, a multilayered entire body of the primary molded article, or a multilayered portion other than the neck. The central layer is preferably of a material with higher heat resistance or stiffness than PET, such as polyarulate, or a blend of PET and polyarulate. A central layer of ethylvinyl alcohol (EVOH) or amorphous nylon (MXD-6) could also be provided to enhance barrier properties.

Another way to stiffen the neck portion is to use a crystallized neck insert. More particularly, a supply of crystallized polycarbonate or PET neck inserts are provided at machine 11, and the inserts are transferred and placed in the injection molding device 17 just prior to injection of the PET. Therefore, the preform is integrally formed with, and at least partly around, the neck insert. This neck insert process is shown in PCT patent application No. PCT/JP91/01287, which is hereby incorporated by reference.

The above multilayering and neck insert methods have the advantage that the preform can be formed by injection molding without the need for any further processing of the neck. Moreover, the material in the neck can be different from the material in the body.

The neck could also be stiffened by using a conventional crystallizing machine to crystallize the neck following primary molding, although this results in an extra process step and does not provide flexibility in the materials used in the neck. Crystallizing after primary blow-molding eliminates the possibility of portions of the preform other than the neck being crystallized and consequently interfering with blow-molding.

In this invention, as mentioned above, the primary molded article is heat-treated and blow-molded into a final container immediately thereafter. Therefore, the primary article can be subjected to more effective heat treatment at higher temperatures for longer duration in an oven, yet achieve faster cycle times than the case where the container subjected to orientation blow-molding is heat-treated in the mold. The primary molded article, having residual stress from being blown from a preform, is heated and shrinks to a size close to the final product and achieves a state where the residual stress is removed by the heat treatment. Therefore, after final blow-molding, the residual stress is much less than that of conventional containers, and the percentage of shrinkage is smaller than for a conventional container.

Moreover, since the primary molded article is formed larger than the final container and is heated and contracted while under builtup internal pressure and pressure from the spring-biased support rod, contraction is controlled as a whole and is stable and uniform, even at higher heat-treating temperatures, such as over 220° C. That is, a tremendous amount of stress relaxation can take place with only a small amount of shrinkage due to the internal pressure and tension rod. Accordingly, containers having relatively uniform wall thickness and high density without center deviation are produced in mass volume. Even greater stress relaxation can be achieved without any substantial increase in cycle times by heating the first and second molds and maintaining the blown articles in contact with the mold walls, thus providing a total of three stress relaxation steps. The additional annealing step in the first mold allows stress reduction without any reduction in the size of the primary article.

When PET resin is used as the raw material for the containers, the occurrence of acetaldehyde is extremely suppressed by means of process including the heat treatment. Thus, preferable containers for drinking are available. For example, the heat treatment temperature range of 130° C. to 280° C. for 20 to 120 seconds reduces acetaldehyde. In fact, for a primary molded article of 2.6 l which is heated at 180° C. for 60 seconds, and blow-molded into a final container of 1.5 l, acetaldehyde was reduced from 2.5612 µg/l (prior to heating) to 0.7268 µg/l (after heating), using the head space measuring method. Thus, taste and smell of the beverage in the bottle will be preserved.

Furthermore, stiffening of the neck can be carried out, if necessary. In addition, a conventional injection orientation blow-molding machine with an oversized and heated first mold can be used in conjunction with a heat-treating device having a further blow-molding device incorporated therein. Accordingly, the apparatus to perform the method is not particularly complicated, and high skill for operation is not required. In addition, the primary molded article is created with a high orientation magnification, and, therefore, a high degree of strain-induced crystallization is already present, even before heat-treating and reblowing. Accordingly, the processing time for higher crystallization by heat treatment can be relatively short, and a container, such as a bottle having enhanced properties (shock resistance, minimal shrinkage, reduction strength, clarity, etc.) in relation to conventional bottles, is obtained.

The present disclosure is illustrative of the invention and is not intended to limit its scope. For example, the various disclosed parameters are intended to provide an example of the invention. They may vary, depending on numerous factors, such as the thickness and shape of the final container, the product which is intended for the final container, the temperature to which the final container will be exposed and duration of exposure, and other factors which would be evident to those of ordinary skill in the art.

What is claimed is:

1. A method of manufacturing a biaxially oriented, thermally stable, blown container having a predetermined capacity comprising the steps of:
   blow-molding a preform into a primary molded article of capacity larger than the predetermined capacity;
   heating the primary molded article in an oven outside of the first mold to cause the primary molded article to shrink and sealing a mouth portion of the article during heating, so that internal pressure within the article increases as the article shrinks;
   allowing the article to shrink against the increased internal pressure to less than the predetermined capacity to produce a shrunken article; and
   blow-molding the shrunken article into a biaxially oriented, thermally stable, blown container having the predetermined capacity.

2. The method of claim 1 wherein, in the step of blow-molding the preform, the capacity of the primary molded article is 1.2 to 3.0 times the predetermined capacity.

3. The method of claim 1 wherein the step of sealing the mouth of the article further includes a step of limiting the internal pressure to a predetermined amount.

4. The method of claim 3 wherein the step of limiting is performed by using a pressure limiting valve.

5. The method of claim 1 further comprising a step of cooling a neck portion of the primary molded article during the step of heating.

6. The method of claim 1 further comprising an initial step of injection molding to form a preform.

7. The method of claim 6 wherein, in the initial step, polyethylene terephthalate is used to form the preform.

8. The method of claim 1 wherein the preform is formed with a neck, and the primary article and container each have the neck, and the method further comprises a step for stiffening the neck.

9. The method of claim 1 wherein the step of heating is carried out for 20 to 120 seconds in an oven between 130° C. and 280° C.

10. The method of claim 1 wherein, during the step of heating, a rod is disposed in into the primary molded article to bias a bottom of the primary molded article outward.

11. The method of claim 10 wherein a bottom of the rod is disposed to engage a center of the bottom of the primary molded article.

12. The method of claim 1 further comprising a step of limiting the internal pressure in the primary molded article during the step of heating and sealing by using a pressure limiting valve.

13. The method of claim 1 wherein the primary molded article, before heating, has a height of about 1.2 to 1.3 times a height of the blown container and has a volume of about 1.4 times that of the blown container.

14. An apparatus for manufacturing a hot-fillable plastic container comprising:

a first blow mold for blow-molding a preform into a primary molded article having a capacity larger than that of the plastic container;

means for heating the primary molded article outside the first blow mold so that the primary molded article shrinks to produce a shrunken primary article;

means for sealing a mouth of the primary molded article while in the means for heating to enable pressure within the primary molded article to increase as the article shrinks; and a final blow mold for blow-molding the shrunken primary molded article into the plastic container having a capacity less than that of the primary molded article.

15. The apparatus of claim 14 further comprising means for limiting the pressure within the primary molded article, the means for limiting being in communication with the means for sealing.

16. A method of manufacturing a biaxially oriented, thermally stable, blown container having a predetermined capacity comprising the steps of:

blow-molding a preform into a primary molded article of capacity larger than the predetermined capacity;

heating the primary molded article in an oven for 20 to 120 seconds between 130° to 280° C. to cause the primary molded article to shrink while applying resistance to shrinkage by sealing a mouth portion of the article and allowing internal pressure to increase while the article shrinks;

allowing the article to shrink against the resistance to less than the predetermined capacity to produce a shrunken article; and blow-molding the shrunken article into a biaxially oriented, thermally stable, blown container having the predetermined capacity.

17. The method of claim 16 wherein, in the step, of blow-molding the preform, the capacity of the primary molded article is 1.2 to 3.0 times the predetermined capacity.

18. The method of claim 16 wherein, in the step of applying resistance to shrinkage, the resistance is further applied by inserting a tensioning rod into the article to bias a bottom of the article outward.

19. The method of claim 16 further comprising a step of cooling a neck portion of the primary molded article during the step of heating.

20. The method of claim 16 wherein a bottom of the rod is disposed to engage a center of the bottom of the primary molded article.

21. The method of claim 16 wherein the preform is formed with a neck, and the primary article and container each have the neck, and the method further comprises a step for stiffening the neck.

22. The method of claim 16 wherein the internal pressure in the primary molded article is limited by a pressure limiting valve.

23. A method for manufacturing a biaxially oriented blown container, the method comprising the steps of:

orientation blow-molding of a preform to form a primary molded article of predetermined dimensions having a configuration of a hollow container having a neck portion defining an open mouth of the container in an apparatus adapted to continuously carry out multiple operations;

inserting an expansible support means through the mouth portion into the interior of the primary molded article and into engagement with a bottom of the container;

closing the mouth of the container;

heating the primary molded container except for the neck;

controlling heat contraction by sealing the article and allowing internal pressure of the primary molded article to build and adjusting the expansible support means so as to maintain the primary molded article under moderate tension in a longitudinal direction, whereby the primary molded article is shrunk against internal pressure;

and re-blow molding said primary molded article into a predetermined container shape, whereby the biaxially oriented blown container is achieved.

24. The method according to claim 23 in which the expansible support means contacts a pocket at the center of the bottom of the primary molded article so as to keep the bottom centered.

25. The method according to claim 23 further comprising a step of stiffening the neck.

26. The method to claim 23 in which the heated primary molded article is positioned in a blow-molding mold, and re-blow molding is initiated before the heat has been dissipated.

27. The method according to claim 21 wherein the primary molded article, before heating, has a volume of 1.2 to 3 times the volume of the desired biaxially oriented blown container.

28. The method according to claim 21 wherein, during heating of the primary molded article except for the neck, the neck is cooled.

29. The method according to claim 21 wherein the preform is made of polyethylene terephthalate.

30. The method according to claim 21 in which the preform is formed by injection molding.

31. The method of claim 21 wherein the primary molded article, before heating, has a height of about 1.2 to 1.3 times a height of the blown container and has a volume of about 1.4 times that of the blown container.

* * * * *

UNITED STATES PATENT AND TRADEMARK OFFICE
CERTIFICATE OF CORRECTION

PATENT NO. : 5,352,402
DATED : October 4, 1994
INVENTOR(S) : Hiroyuki Orimoto; Saburo Suzuki; Fumiya Amari It is certified that error appears in the above-indentified patent and that said Letters Patent is hereby corrected as shown below:

Column 1, line 63, after "mold" change "wails" to
-- walls --.

Column 2, line 4, change "hot-fill" to -- hot-filled --.

Column 3, line 14, change "container," to
-- container. --.

Column 4, line 12, change "embodiments," to
-- embodiment, --.

Column 12, line 63, before "above" insert -- the --.
Column 12, line 67, before "bottom" insert -- the --.

Column 16, line 52, after "disposed in" delete "into".

Column 17, line 9, change "while in the means for heating to enable" to -- while the means for heating enables --.

Signed and Sealed this

Twenty-sixth Day of September, 1995

*Attest:*

*Attesting Officer*

BRUCE LEHMAN

*Commissioner of Patents and Trademarks*